(12) United States Patent
Wolf et al.

(10) Patent No.: US 6,320,866 B2
(45) Date of Patent: *Nov. 20, 2001

(54) NETWORK TERMINATION

(75) Inventors: Michael Wolf, Mundelsheim; Helmut Brunner, Leonberg, both of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,309

(22) Filed: Mar. 20, 1998

(30) Foreign Application Priority Data

Mar. 21, 1997 (DE) .............................. 197 11 767

(51) Int. Cl.$^7$ ..................................... H04J 1/02
(52) U.S. Cl. ............................................ 370/420
(58) Field of Search .................... 379/413, 399, 379/159, 93.19; 370/244, 349, 257, 509, 373, 420, 422, 426, 439, 443, 444, 468, 474, 476, 482, 496, 449, 445, 450, 352, 338, 431, 241, 522, 524; 709/244, 218; 380/48; 714/738

(56) References Cited

U.S. PATENT DOCUMENTS

| | | | | |
|---|---|---|---|---|
| 4,500,989 | * | 2/1985 | Dahod ................................ | 370/431 |
| 4,989,202 | * | 1/1991 | Soto et al. ............................ | 370/13 |
| 5,175,767 | * | 12/1992 | Landry ................................. | 380/48 |
| 5,499,048 | * | 3/1996 | Seo ..................................... | 348/10 |
| 5,530,748 | * | 6/1996 | Ohmori ............................... | 379/413 |
| 5,673,252 | * | 9/1997 | Johnson et al. ..................... | 370/449 |
| 5,883,944 | * | 3/1999 | Burke et al. ........................ | 379/159 |

FOREIGN PATENT DOCUMENTS

| | | |
|---|---|---|
| 29601274 | 2/1997 | (DE) . |
| 0647044 | 4/1995 | (EP) . |

OTHER PUBLICATIONS

"Stromversorgung.von Zustzgeräten am ISDN–Hauptanschluβ" by Dieter Klein, In: ntz, Bd. 41 1988, H–10, S. 566–569.

"ISDN–Produkte für Europa", telekom praxis 3/94, pp. 29–35, by Wolfgang Harderich, Peine.

* cited by examiner

Primary Examiner—Dang Ton
(74) Attorney, Agent, or Firm—Ware, Fressola, Van Der Sluys & Adolphson LLP

(57) ABSTRACT

Network terminations are made available to a customer and installed by a network operator of a digital communications network. The customer is responsible for the supply of power to the network terminations. In the event of a power failure, a network termination of the digital communications network sends an error message (FM) to the customer who is responsible for correcting the power failure. The error message (FM) is sent in the payload of the digital message signals. The network termination (NT) includes a power supply (USV) which in the event of the power failure can sustain output for a predetermined period of time, in which the error can be signaled. To signal the error, the payload may be overwritten with a predetermined bit pattern (BM).

23 Claims, 2 Drawing Sheets

NETWORK TERMINATION

TECHNICAL FIELD

This invention relates to a network termination for a digital communications network.

BACKGROUND OF THE INVENTION

Such network terminations are needed at the subscriber interface in various digital communications networks. For example, there are standard network terminations and primary multiplex network terminations for ISDN (2 Mb). Network terminations are also used in ATM (asynchronous transfer mode)-based digital communications networks and in networks based on other transmission techniques.

An article by W. Harderich ("ISDN-Produkte für Europa", telekom praxis 3/94, pp. 29–35) describes that a network termination for ISDN is made available to a subscriber and installed by a network operator. On the other hand, however, the network termination is on the subscriber's premises and is supplied with power by the subscriber.

A problem associated with this constellation arises if the power supply of the network termination is interrupted by a power failure at the subscriber. The subscriber will notice at a terminal only that a malfunction has occurred in the communications network but cannot locate the error and will not realize that the correction of the error falls within his or her purview.

The same problem is encountered with leased lines by which a customer interconnects different ones of his subnetworks via a public network. Here, too, network terminations of the public network operator are installed on the customer's premises and supplied with power from the customer, and it is not possible for the customer to detect a power failure at the network terminations. For 2-Mb PCM (pulse code modulation) connections, an error indication bit (SA bit) is defined in the frame of the message signals which is set in the event of a power failure at the network terminations in order to signal the error, but this error indication bit can be transmitted only to the public network operator, not to the customer.

SUMMARY OF THE INVENTION

It is therefore an object of the invention to provide a network termination which in the event of a power failure permits error detection by a customer responsible for the supply of power. Another object of the invention is to provide a method of signaling a power failure at a network termination.

These objects are attained by the a network termination for a communications network, the network termination comprising a power supply connectable to an external power source, having means for detecting a power failure of the external power source, means for maintaining power for a predetermined period of time in the event of a power failure, and means for sending an error message in the payload of a message signal.

The objects are also attained by a method of signaling a power failure at a network termination of a communications network, comprising the steps of detecting the power failure at the network terminations; maintaining power for a predetermined period of time; sending an error message in the payload of a message signal; and detecting the error message.

One advantage of the invention is that it makes available a power failure message at a management system of the customer. It is therefore especially suitable for leased lines, over which an error indication bit cannot be transmitted from one end to the other.

The invention can also be used to advantage where the feed-in point of a digital communications network is not in the same room or the same building as the customer's signal-processing circuitry and where a power failure cannot be detected by the fact that other transmission equipment also fails because of the power failure.

BRIEF DESCRIPTION OF THE DRAWINGS

The invention will become more apparent from the following description of two embodiments when taken in conjunction with the accompanying drawings, in which.

BEST MODE FOR CARRYING OUT THE INVENTION

A basic idea of the invention is to send, in the event of a power failure at a network termination of a digital communications network, an error message to the subscriber or customer who is responsible for correcting the power failure. According to one aspect of the invention, the error message is sent in the payload of the digital message signals. According to another aspect of the invention, the network termination is fitted with a power supply which in the event of a power failure can sustain output for a predetermined period of time, in which the error can be signaled.

Figure 1:
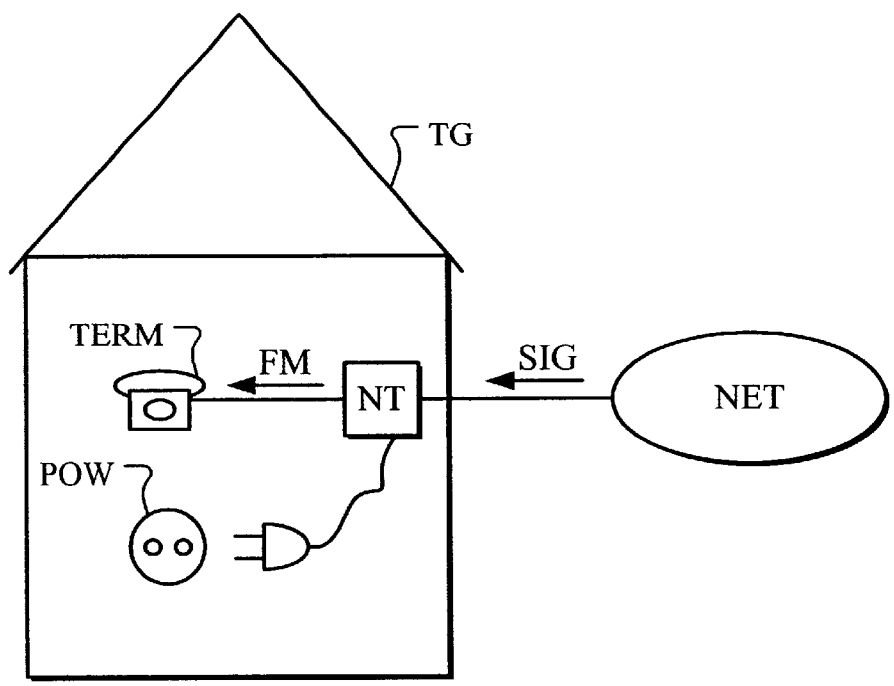
FIG. 1 shows a customer location with a network termination of a digital communications network.

In a first embodiment, shown in FIG. 1, a subscriber's terminal TERM is connected to a digital communications network NET. A network termination NT is connected between terminal TERM and communications network NET. The network termination NT belongs to the operator of the communications network NET and was installed by this operator on the subscriber's premises TG. It is therefore the responsibility of the subscriber to connect the network termination NT to an external power source POW, thus ensuring the supply of power to the network termination (NT).

In the first embodiment, the power plug of a power supply incorporated in the network termination has been withdrawn from a wall socket of the external power source POW. Therefore, a power failure occurs at the network termination NT. After the occurrence of the power failure, the power supply of the network termination NT can sustain output for a given period of time. In this period, the network termination NT sends at its outputs an error message FM in the payload of message signals SIG received from the communications network NET. The error message FM can be interpreted by the subscriber's terminal TERM, which then indicates on a display that a power failure has occurred at the network termination NT. Thus, the subscriber can correct the error by restoring the supply of power, while without the error message, the subscriber would only detect a loss of signal at his/her terminal and would suppose that the error lies at the network operator.

Figure 2:
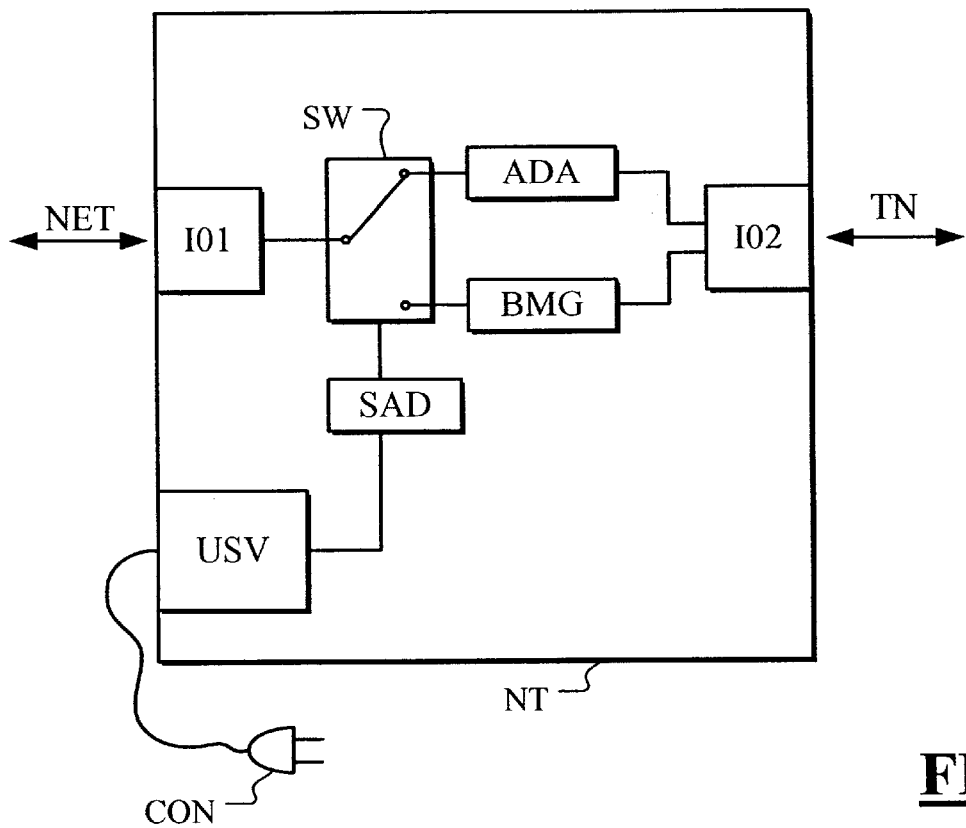
FIG. 2 is a block diagram of the network termination.

The network termination of the first embodiment is shown schematically in FIG. 2. It includes an interface unit IO1 for providing the connection to the communications network NET and an interface unit IO2 for providing the connection to the subscriber line TN. During error-free operation, the two interface units IO1, IO2 are connected together via an interface adapter ADA. The latter adapts the subscriber line TN to the interface to the communications network NET. In the first embodiment, the network termination is a standard network termination for ISDN, and the interface adapter ADA provides conversion of the two-wire $U_{KO}$ interface to the four-wire $S_0$ interface.

The network termination NT further includes a power supply USV which, in the event of a power failure, is capable of maintaining power for a predetermined period of time. The power supply USV is connectable via a power plug CON to an external power source. It may be an uninterruptible power supply as is also used for LAN servers (LAN: local area network), for example. In the event of a power failure, such an un-interruptible power supply can maintain power for a few minutes. However, it may also suffice to use a power supply with parallel-connected capacitance which can sustain output for a few hundred milliseconds (e.g., 200 ms) in the event of a power failure.

Connected to the power supply USV is a power failure detection circuit SAD, which detects a power failure and then operates a switch SW to connect the interface units IO1, IO2 to a bit pattern generator BMG which overwrites the payload of received message signals with a predetermined bit pattern. As long as a reserve of power is available from the power supply, the bit pattern is sent out at the two interface units IO1, IO2 to signal the occurrence of the error.

Figure 3:
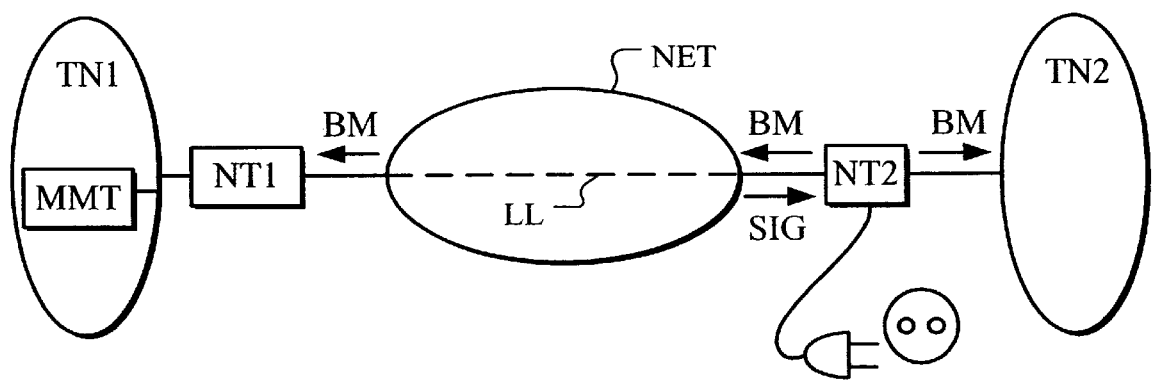
FIG. 3 shows two subnetworks of a customer which are interconnected by a leased line.

A second embodiment is the configuration shown in FIG. 3, where two subnetworks TN1, TN2 of a customer are interconnected by a leased line LL of a network operator. The leased line forms part of a digital communications network NET. Connected between the communications network NET and a respective one of the subnetworks TN1, TN2 is a network termination NT1, NT2 which, like in the first embodiment, is supplied with power from the customer's premises.

If a power failure occurs at the second network termination NT2 as shown in FIG. 3, the second network terminations NT2 will overwrite the payload of the message signal SIG with a given bit pattern BM for a period of 200 ms. Both the message signals received from the communications network NET and the message signals sent in the direction of the communications network NET are over written with the bit pattern BM. In this manner, the customer is informed of the occurrence of the error both in the first subnetwork TN1 and in the second subnetwork TN2.

This is particularly advantageous if, as shown in FIG. 3, the customer operates in the first subnetwork TN1 a management system MMT responsible for all subnetworks, which must register the error. The bit pattern BM sent out by the network termination NT2 for 200 ms is transmitted over the leased line LL to the subnetwork TN1 and can be evaluated there by the management system MMT. This could not be accomplished with error indication bits in the frame of the message signals, since the frames are changed in the communications network NET, so that error indications will not reach the management system MMT in the customer's first subnetwork TN1.

According to an advantageous aspect of the invention, the bit pattern BM allows an unambiguous inference to the network termination NT2 at which the error occurred. Thus, the customer immediately receives information as to where the power failure occurred and has to be corrected. This is of particular advantage if the customer operates two or more subnetworks interconnected by leased lines and including two or more network terminations NT1, NT2 which are located far apart, for example in different cities. This unambiguous inference capability can be implemented by providing all network terminations NT1, NT2 with identification numbers (e.g., serial numbers) and sending the respective number as part of the error message or the bit pattern.

Instead of overwriting the entire payload with a predetermined bit pattern BM, an error message FM may be appended to or inserted into the payload. This is possible if the transmission capacity is not completely utilized by the subscriber or customer or if the communications network is one with a flexible transfer rate (such as ATM). The error message could also be evaluated in a PCM multiplexer for primary rate accesses or in a private telecommunications switching system.

Figure 4:
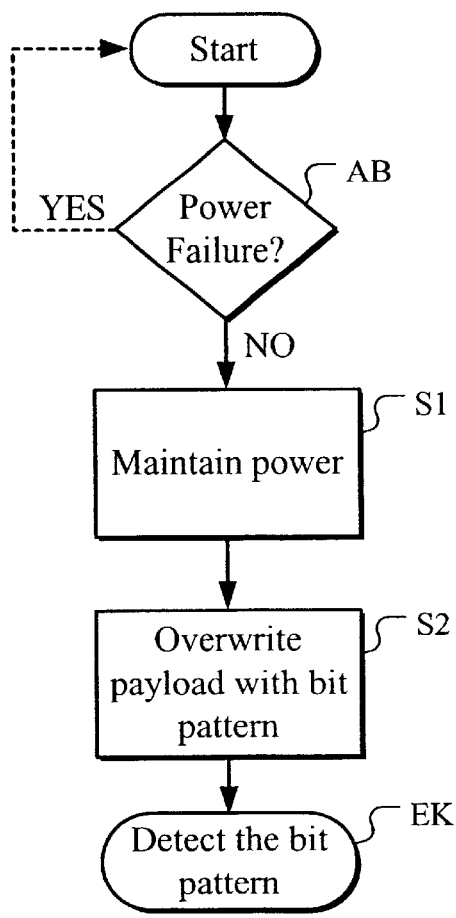
FIG. 4 shows a flowchart of the method.

As shown in FIG. 4, the steps of the process for signaling a power failure are as follows:

First it is determined by a query AB whether a power failure has occurred at a network termination. If now power failure has occurred, the process can be restarted after a possible waiting time.

If a power failure has occurred, maintenance of power is ensured in a first step S1. This is accomplished in the first embodiment by means of the uninterruptible power supply.

In a second step S2, an error message is then sent in the payload of message signals received at the network termination affected. To do this, the payload may be overwritten with a predetermined bit pattern, for example.

Detection EK of the error message completes the process; the error has been signaled. The detection may take place in, for example, a management system of the customer, which then indicates a corresponding error message or triggers an alarm.

The probability of a false error message or a false alarm due to accidental agreement between transmitted data and the predetermined bit pattern can be excluded by initiating an error message only after failure of the network termination and the loss of signal caused thereby.

What is claimed is:

1. A network termination (NT) for a communications network (NET), said network termination (NT) comprising a power supply (USV) connectable to an external power source (POW), and said network termination being capable of sending a message signal (SIG) having a payload and a frame, comprising:

means (SAD) for detecting a power failure of the external power source (POW);

means (USV) for maintaining power for a predetermined period of time in the event of a power failure; and means (BMG) for sending an error message (FM) in the payload of the message signal (SIG) to at least one subscriber terminal which is separate from the network termination (NT), wherein the error message (FM) overwrites at least a portion of the payload of the message signal (SIG).

2. The network termination (NT) as claimed in claim 1 wherein the means (BMG) for sending the error message is a bit pattern generator for overwriting the payload with a predetermined bit pattern (BM).

3. The network termination (NT) as claimed in claim 1 which is unambiguously identifiable with the aid of the error message.

4. The network termination (NT) as claimed in claim 1 which is designed for use with leased lines.

5. The network termination (NT) as claimed in claim 1 wherein the means for maintaining power can sustain output for at least 200 ms.

6. The network termination (NT) as claimed in claim 1 wherein the means for maintaining power is an uninterruptible power supply (USV).

7. A method of signaling a power failure at a network termination (NT) of a communications network (NET), wherein the network termination is capable of sending a message signal (SIG) having a payload and a frame, comprising the steps of:

detecting the power failure at the network termination (NT);

maintaining power for a predetermined period of time;

sending an error message (FM) in the payload of the message signal (SIG) to a subscriber's terminal which is separate from the network termination (NT); and detecting the error message (FM).

8. The method as claimed in claim 7 wherein the error message is indicated or an alarm is triggered after a loss of signal is detected.

9. A network termination (NT) for a communications network (NET), said network termination (NT) comprising a power supply (USV) connectable to an external power source (POW), and said network termination being capable of sending a message signal (SIG) having a payload and a frame, characterized by:

means (SAD) for detecting an outage type of power failure of the external power source (POW) wherein the power failure is due to power withdrawal only;

means (USV) for maintaining power for a predetermined period of time in the event of a power failure; and means (BMG) for sending an error message (FM) in the payload of the message signal (SIG) to a subscriber equipment which is separate from the network termination (NT).

10. The network termination (NT) as claimed in claim 9 wherein the means (BMG) for sending the error message is a bit pattern generator for overwriting the payload with a predetermined bit pattern (BM).

11. The network termination (NT) as claimed in claim 9 which is unambiguously identifiable with the aid of the error message.

12. The network termination (NT) as claimed in claim 9 which is designed for use with leased lines.

13. The network termination (NT) as claimed in claim 9 wherein the means for maintaining power can sustain output for at least 200 ms.

14. The network termination (NT) as claimed in claim 9 wherein the means for maintaining power is an uninterruptible power supply (USV).

15. A method of signaling an outage type of power failure at a network termination (NT) of a communications network (NET), wherein the network termination is capable of sending a message signal (SIG) having a payload and a frame, comprising the steps of:

detecting the outage type of power failure at the network termination (NT) wherein the power failure is due to power withdrawal only;

maintaining power for a predetermined period of time;

sending an error message (FM) in the payload of the message signal (SIG) to a subscriber equipment which is separate from the network termination (NT); and detecting the error message (FM).

16. A method as claimed in claim 15 wherein the error message is indicated or an alarm is triggered after a loss of signal is detected.

17. The network termination (NT) of claim 9, wherein the subscriber equipment is a subscriber's terminal.

18. The method of claim 15, wherein the subscriber equipment is a subscriber's terminal.

19. The network termination (NT) of claim 9, wherein the subscriber equipment is a PCM multiplexer.

20. The network termination (NT) of claim 9, wherein the subscriber equipment is a private telecommunications switching system.

21. A network termination (NT) located at an interface between a public communications network (NET) and a subscriber, said subscriber being responsible for supply of power to the network termination (NT), said network termination (NT) comprising a power supply (USV) connectable to an external power source (POW), and said network termination being capable of sending a message signal (SIG) having a payload and also having a system overhead, the network termination (NT) comprising:

means (SAD) for detecting a power failure of the external power source (POW);

means (USV) for maintaining power for a predetermined period of time in the event of a power failure; and means (BMG) for putting a power failure error message (FM) into the payload of the message signal (SIG), as opposed to within the system overhead of the message signal (SIG), and sending the power failure error message (FM) to at least one subscriber terminal which is separate from the network termination (NT), wherein putting the power failure error message (FM) into the payload enables the subscriber to detect and take steps to correct the power failure at the network termination.

22. The network termination (NT) of claim 21, wherein the error message (FM) overwrites at least a portion of the payload of the message signal (SIG).

23. The network termination (NT) of claim 22, wherein message signals sent toward the communications network (NET) are also overwritten with error information.

* * * * *